United States Patent
Eccardt et al.

(10) Patent No.: US 6,320,239 B1
(45) Date of Patent: Nov. 20, 2001

(54) SURFACE MICROMACHINED ULTRASONIC TRANSDUCER

(75) Inventors: Peter-Christian Eccardt, Ottobrunn; Kurt Niederer, Eggenfelden; Thomas Scheiter, Oberhaching; Martin Vossiek, München; Thomas Kölpin, Amberg, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/297,243

(22) PCT Filed: Oct. 28, 1997

(86) PCT No.: PCT/DE97/02505

§ 371 Date: Apr. 27, 1999

§ 102(e) Date: Apr. 27, 1999

(87) PCT Pub. No.: WO98/19140

PCT Pub. Date: May 7, 1998

(30) Foreign Application Priority Data

Oct. 30, 1996 (DE) ................................ 196 43 893

(51) Int. Cl.$^7$ ................................ H01L 29/72
(52) U.S. Cl. .................. 257/415; 257/416; 257/417; 257/419; 257/528
(58) Field of Search ................... 257/415, 416, 257/417, 419, 528

(56) References Cited

U.S. PATENT DOCUMENTS

| 4,699,009 | 10/1987 | Maslak et al. |
| 4,873,871 | 10/1989 | Bai et al. |
| 5,700,702 | * 12/1997 | Kloss et al. ........................ 287/415 |

FOREIGN PATENT DOCUMENTS

| 43 18 466 | 12/1994 | (DE) . |
| 0 102 069 | 3/1984 | (EP) . |
| WO 95 19572 | 7/1995 | (WO) . |

OTHER PUBLICATIONS

"Micromachined Ultrasonic Transducers: 11.4 MHz Transmission in Air and More", Ladabaum et al., Appl. Phys. Lett. vol. 68(1) (1996), pp. 7–9 Jan.

"A Surface Micromachined Elecrostatic Ultrasonic Air Transducer", Haller et al., IEEE Trans. Ultrason., Ferroelect. Freq. Contr. vol. 43(1) (1996), pp. 1–6, Jan.

"Silicon Condenser Microphone with Integrated Field–Effect Transistor", W. Kuhnel, Sensors and Actuators, vol. 26 (1991), pp. 521–525 (1991), Jan.

"Micromachined Ultrasonic Transducers (MUTs)", Ladabaum et al., 1995 IEEE Ultrasonics Symposium (1995), pp. 501–504, Jan.

\* cited by examiner

*Primary Examiner*—Edward Wojciechowicz
(74) *Attorney, Agent, or Firm*—Schiff Hardin & Waite

(57) ABSTRACT

A spacer layer (7) with a cavity (8) etched out therein and a diaphragm (2) arranged thereabove on the spacer layer are located on a silicon substrate (1) with a doped region (5) formed therein, whereby the doped region and the diaphragm are electrically connected via terminal contacts (4, 6) to electronic components (13) that are likewise integrated in the substrate (1). The electronic component are a component part of the operating circuit that can also be used for the drive of the diaphragm and for evaluating the diaphragm oscillations. The integration makes it possible to arrange the micromachined transducer components as array that can be electronically driven as phased array.

23 Claims, 3 Drawing Sheets

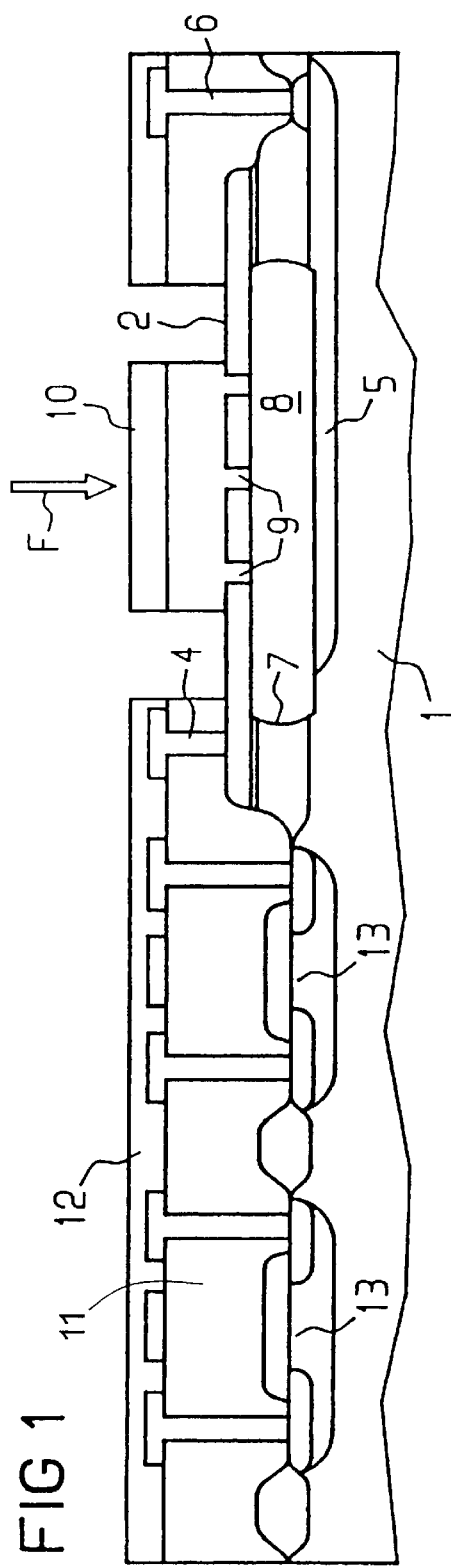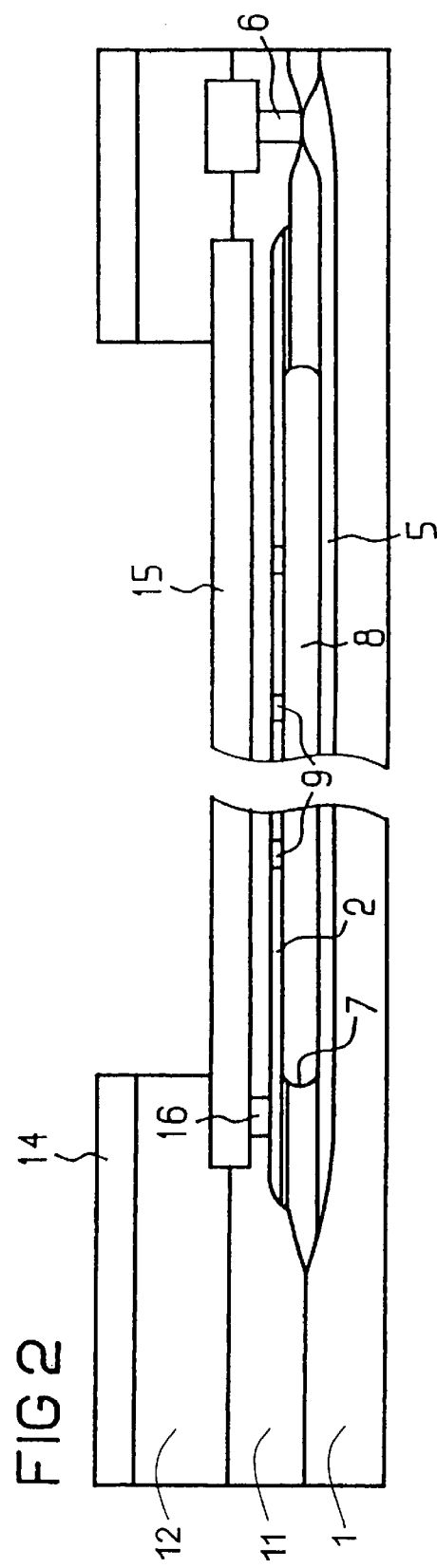

SURFACE MICROMACHINED ULTRASONIC TRANSDUCER

BACKGROUND OF THE INVENTION

The present invention is directed to an ultrasonic transducer and more particularly to an ultrasonic transducer that is manufactured with surface micromachining.

The publication by I. Ladabaum et al., "Micromachined Ultrasonic Transducers (MUTs)" in 1995 IEEE Ultrasonics Symposium, pages 501 through 504, descloses an ultrasonic transducer that was manufactured with the method of surface micromachining. Ultrasonic transducer emitting diaphragms were produced on a silicon substrate by etching out 1 μm thick oxide layers.

SUMMARY OF THE INVENTION

An object of the present invention is to provide an improved ultrasonic transducer that can be employed for farther-reaching integration.

This object is achieved in accordance with the present invention in an ultrasonic transducer which uses the method of surface micromachining, as employed in the framework of a VLSI process, particularly a CMOS process, in order to integrate micromechanical components together with drive electronics on a chip. A thin layer, which is preferably polysilicon but, can also be silicon nitride at least in part, is used as a diaphragm of the ultrasonic transducer. This thin layer is formed on an auxiliary layer, so that a slight interspace can be created between the diaphragm and a substrate by etching out the auxiliary layer. The excitation of ultrasonic oscillations electrosatically ensues because the diaphragm is made to be electrically conductive (by doping the polysilicon or by applying a conductive layer) and an electrically conductive region is formed in the substrate by doping. Fundamentally, the electronic circuits previously utilized for ultrasonic transducers can also be employed here. However, micromachine ultrasonic transducers can advantageously be integrated on the same substrate as electronic drive components.

New application possibilities derive as a result thereof in contrast to previous, non-integrated solutions, resulting in cost-beneficial and dependable circuits. A preferred embodiment provides additional protective measures that decouple the operating circuit of the transducer from a drive or evaluation circuit such that more sensitive components are protected against over-voltages. Alternative embodiments provide additional measures with which the conductivity or stiffness of the diaphragm are adapted. The inventive transducer is especially well-suited for arrays, i.e. for grid-shaped arrangements of a number of individual transducers that can be driven individually or in groups as needed. The far-reaching integration of the inventive ultrasonic transducer makes it possible to connect such an array to electronic circuits in a comparatively simple way. As a result of the micromachine embodiment of the transducer itself, the transducer can be offered in a number of embodiments, particularly in largely miniaturized dimension. Due to the integration of the required drive and evaluation circuits on the substrate, influences of external disturbances are minimized; complicated electrical wiring is eliminated; sensor-specific signal processing on the chip is possible, which further simplifies the drive from the outside; and the transducers can be cost-beneficially manufactured in high numbers and with low manufacturing tolerances.

DESCRIPTION OF THE DRAWINGS

FIG. 1 shows an ultrasonic transducer integrated with electronic components in cross section in accordance with the invention.

FIG. 2 shows an embodiment of the micromachined components in accordance with the invention.

DESCRIPTION OF THE PRESENTLY PREFERRED EMBODIMENTS

Figure 3:
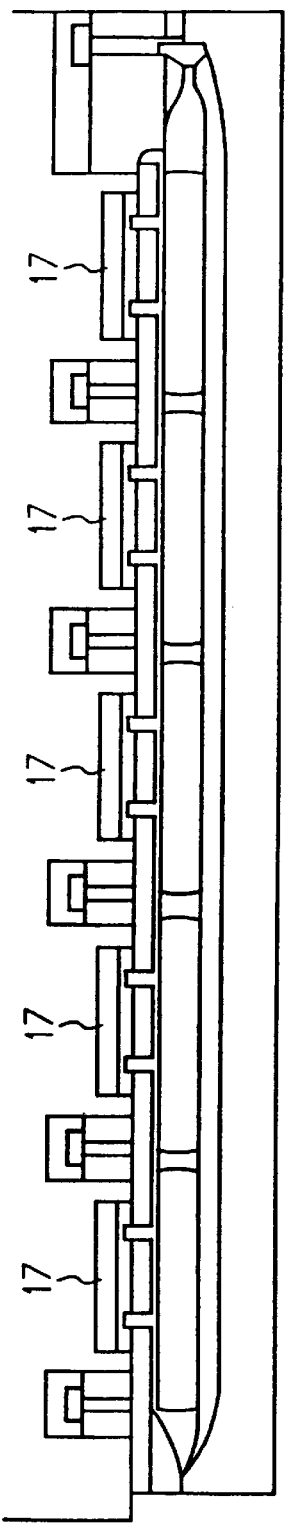
FIG. 3 shows an arrangement of a number of ultrasonic transducers in cross section in accordance with the invention.

FIG. 1 shows the structure of an ultrasonic transducer in cross section in accordance with the present invention. A doped region 5 is formed in a substrate 1, preferably of silicon. A diaphragm 2 is situated on a spacer layer 7 in which a cavity 8 is fashioned. This cavity 8 forms an interspace between the doped region 5 and the diaphragm 2 and can be formed into the material of the spacer layer 7, which is initially produced as auxiliary layer or sacrificial layer by etching the material of the spacer layer 7 out through etching openings 9 in the diaphragm 2. When this sacrificial layer is made of silicon oxide, for example by local oxidation of the silicon surface (LOCOS), HF in aqueous solution is suitable as etchant; plasma etching can also be employed. The etching openings 9 are closed with a closure layer. The manufacture is simplified in that the planarization layer 11 that is also used for covering the electronic components is employed as such a closure layer 11. BPSG (borophosphorous silicate glass) is preferably used for the planarization layer 11, as BPSG provide a smooth surface when thermally flowed. MOSFETs 13, which can be manufactured as complementary MOSFETs in the framework of the CMOS process are shown as components in the substrate 1 as an example in FIG. 1. It is therefore possible to completely integrate the inventive ultrasonic transducer together with all components required for the drive electronics.

The electrical connection ensues by vertical conductive connections that are present in the planarization layer 11. These conductors are formed, for example, into holes that are etched and filled with suitable metal. A first metallization level is applied onto the upper side of the planarization layer 11, potentially in the same method step with the hole filling, and is structured. Further intermediate oxide layers 12 can then be applied in order to create a number of metallization levels. In the presently preferred embodiment of FIG. 1, the diaphragm 2 is made of doped polysilicon that can be applied together with the polysilicon stripes that are provided as gate electrodes of the transistors. This doped polysilicon of the diaphragm 2 is provided with a terminal contact 4. The doped region 5 is provided with a contact 6 as a cooperating electrode for the diaphragm 2. A remaining part of the planarization layer 11 and further layers deposited thereon has been left on the diaphragm 2 as stamp 10 in this preferred embodiment. The etching openings 9 are closed with this stamp 10 and a stiffening of the diaphragm 2 is effected at the same time. The thickness of this stamp 10 can be selected dependent on the appertaining demands.

The thickness of the layer or layer sequence (diaphragm 2 and potentially further layers, for example the stamp 10) functioning as diaphragm during operation of the transducer is typically approximately 0.5 μm to 5 μm in preferred embodiments, and is dependent on the employment of an additional stiffening of the diaphragm such as the stamp 10. The diaphragms employed for the acoustic transducer can comprise different shapes (for example, quadratic, rectangular, hexagonal, octagonal, round). Typical diaphragm dimensions lie in the range from 20 to 200 μm (greatest expanse of the part of the diaphragm layer provided for the sound emission).

FIG. 2 shows a preferred embodiment wherein, in addition to the substrate 1, the diaphragm 2, the doped region 5, the contact 6 applied thereon, the spacer layer 7, the cavity 8, the etching openings 9, the planarization layer 11 and the intermediate oxide 12, the following components are incorporated a passivation layer 14 on the upper side, a cover layer 15 that can be composed of aluminum over the diaphragm, and a terminal contact 16, which that conductively connects the diaphragm 2 and the cover layer 15 to one another. In this preferred embodiment, the diaphragm 2 can be manufactured extremely thin, whereby an adequate mechanical stability and stiffness of the diaphragm 2 is effected by the applied cover layer 15. The cover layer 15 can be applied directly on the membrane 2 or, as shown, on the lower planarization layer 11. Together, for example, with the first metal layer, the cover layer 15 is then applied following the filling the holes with metal. The cover layer 15 can thus be a component part of the first metallization level that is employed for the structuring of interconnects. When the doped region 5 and a conductive cover layer 15 (of, for example, metal) are employed for the capacitive operation of the transducer, the diaphragm 2 need not be electrically conductive and the contact 16 can be omitted. In the preferred embodiment of FIG. 2, the cover layer 15 of aluminum is directly connected to the first interconnect level and the contact 16 is omitted.

The largely miniaturized embodiment and the complete integration with the electronic components makes it possible to incorporate the inventive ultrasonic transducer as an individual component in a transducer array, i.e. an arrangement of a number of such individual components. Such an arrangement is shown schematically in crossection in FIG. 3. A number of individual transducers 17 are schematically shown therein in crossection. For example, these transducers can be arranged in a quadratic grid, which is shown excerpted in plan view in FIG. 4. The emission surfaces of the individual transducers 31 are shown quadratically therein. Alternatively, the emission surfaces of the diaphragms of the individual transducers 31 can form other geometrical shapes, for example one of the aforementioned geometrical shapes. An especially suitable embodiment of the array provides a hexagonal grid and regular hexagons as emission surfaces.

Figure 4:
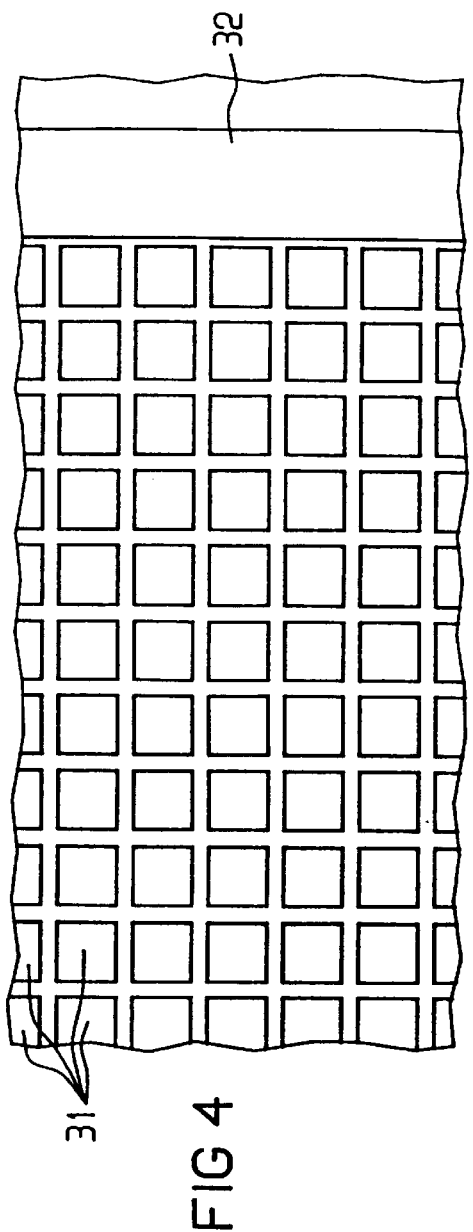
FIG. 4 is a plan view of a grid of an ultrasonic transducer array in accordance with the present invention.

The emission surfaces need not all be the same but can comprise different shapes and sizes. In FIG. 4, a region 32 that is provided for electronic components is located to the side of the grid-shaped arrangement. It is advantageous when electronic components are also arranged in the interspaces between the individual transducers 31 in order to shorten and simplify the electrical connections between the individual transducers and the electronic components. In particular, the grid arrangement need not be periodic, i.e. an individual transducer 31 need not be present at every point of the grid. An arrangement that is composed of a number of individual transducers 31 and that exhibits no periodicity at all can be advantageous for certain applications.

Given an array, the transducers 31 can be connectable to one or more inputs or, outputs of the drive circuit either individually or in groups, for example via a multiplexer arrangement integrated with the electronic circuit. Such an alternating connection is preferably realized by electronic switches that, for example, are formed by complementary MOSFETs.

The operation of such an array can ensue differently in very different ways and for different applied purposes. When all individual transducers 31 are operated simultaneously, to which end the individual components can be permanently electrically connected to one another via the interconnect levels, an ultrasonic transducer is obtained that, given an enlarged emission surface and emission power, exhibits the advantages of individual transducers manufactured with micromachining. By driving a respective number of successive rows and columns of the grid of the arrangement, the individual transducers 31 belonging to a sub-group of predetermined size can be respectively activated instead. Given the quadratic grid, for example, a specific number of individual transducers 31 following one another in both directions can be activated (for example, quadratic sub-areas of 3×3 or 10×10 individual transducers). These sub-arrays can be permanently set in a higher-ranking grid or the selection of the sub-arrays ensues in sliding fashion in that the transducers at one side of the selected sub-group of individual transducers are deactivated, i.e. turned off, and are activated at the other side of a row or column of individual transducers 31. The same is true of a different grid shape or a generally different arrangement of the individual transducers 31.

Pseudo-random transducer arrangements, which are referred to as random arrays, offer additional advantages. By using comparatively few individual transducers 31, directional diagrams that comprise a pronounced principal maximum and very low secondary maximums can thus be generated. Such a transducer arrangement is obtained, for example, in that the transducers are arranged in a grid and individual grid points that are determined according to pseudo-random selection criteria are thereby left out. Electronic components can then be arranged in the gaps in the occupation of the grid. An irregular distribution of the individual transducers 31 can also be utilized for providing individual transducers 31 having different sizes and shapes of the emission surfaces.

Inventive transducers of different resonant frequencies can be realized by using different mechanical and/or electrical configurations—for example by suitable selection of parameters such as the thickness and stiffness of the diaphragm and the size and shape of the emission surfaces. In particular, the resonant frequencies of the transducers of an array can differ from one another. A stochastic distribution of the individual transducers 31 with different resonant frequencies on a grid, on an interrupted grid (random array) or in a completely aperiodic arrangement yields an array with significantly greater bandwidth, as can be particularly desirable given emission in air.

An embodiment of an inventive array can, for example, provide that a quadratic arrangement of 100×100 arrays be subdivided into 10×10 quadratic arrangements of 10×10 individual transducers 31. These sub-arrays of 100 individual transducers 31 can then be simultaneously activated independently of one another, or it is possible to undertake a sliding drive in each of these sub-arrays of, for example, 4 individual transducers 31 arranged in the square. Alternatively, a fixed division of the grid can be foregone. It can be advantageous for certain applications when a subgrid of, for example, 100 individual transducers 31 arranged in a square is activated, whereby an outer row or column of this array is then turned off and a further row or column of 10 individual transducers 31 are added at the other side instead. The spatial emission of the overall array can be controlled in this way. The principal emission direction is located perpendicular over the plane of the arrangement. Given the quadratic grid, the maximum of the acoustic pressure given emission is located roughly over the middle of the pertaining sub-array. A sliding drive of the array therefore allows the maximum of the emitted acoustic pressure ("transmission lobe") to migrate spatially.

Practically all applications of known phased arrays can be realized with a row-by-row and column-by-column drive of individual transducers 31 or small sub-groups of individual transducers 31. The principle of the phased array is based upon a plurality of ultrasonic transducers that are excited with signals that are controlled in phase position or in their time position and/or in amplitude. A number of transducers is simultaneously operated but the adjacent signals, for example, are shifted by a specific phase difference relative to one another in a direction of the arrangement. As a result thereof, the sound beam given transmission mode can be swept, defined directional diagrams can be generated and the beam can be focussed onto specific points in space. The same possibilities can also be computationally realized by superimposing the reception signals. Both a directional effect in transmission mode as well as a detection of the direction from which an acoustic wave is incident during reception are thus possible. A suitable evaluation circuit therefore allows the determination of all information that can be detected given ultrasonic reception with such an array.

The drive of a transducer arrangement can be analog or digital with a shift register that can be very expediently arranged in the region 32 that laterally adjoins the actual array. When using a shift register for transmission mode, the transmission signal is applied to the input of the shift register. The outputs of the shift register cells are conducted onto the rows or columns of transducers 31 in the array. By varying the clock frequency in the shift register, the phase difference between the transducers 31 addressed in common and, thus, the emission angle in space can be varied. Given an array with rotational-symmetrical arrangement of the individual transducers 31, the individual transducers 31 lying on concentric rings around the symmetry center of the arrangement can be operated equiphase; i.e. the transducers on rings farther toward the outside lead in order to compensate the greater path length of the signals to a point over the mid-point of the arrangement. The distance of the focus of the emitted ultrasound is thus also adjustable.

A further improvement of the inventive ultrasound transducer provides an improved operating circuit. In those instances wherein the height of the cavity 8 under the diaphragm 2 (see FIG. 1) cannot be manufactured adequately small, a relatively high dc voltage is required as bias between the diaphragm 2 and the doped region 5. Such a bias increases the sensitivity of the transducer. Such a bias is preferably selected in the range from 10 to 200 Volts. A typical value given a diaphragm dimension of 50 $\mu$m through 100 $\mu$m is 100 Volts. The sensitivity of the transducer is dependent on various parameters. The thickness and stiffness of the diaphragm are critical, as are the dimensions of the emission surface. A gas enclosed in the cavity 8 stiffens the diaphragm. When ultrasound is to be emitted into air, a diaphragm size with 100 $\mu$m through 200 $\mu$m as largest dimension of the emission surface is preferred. In order to enable a noise-free operation of the transducer, a higher bias value must be selected all the greater the height of the cavity.

Thus, a protection of the electronic components of the drive circuit is required because of the high dc voltage required.

Figure 5:
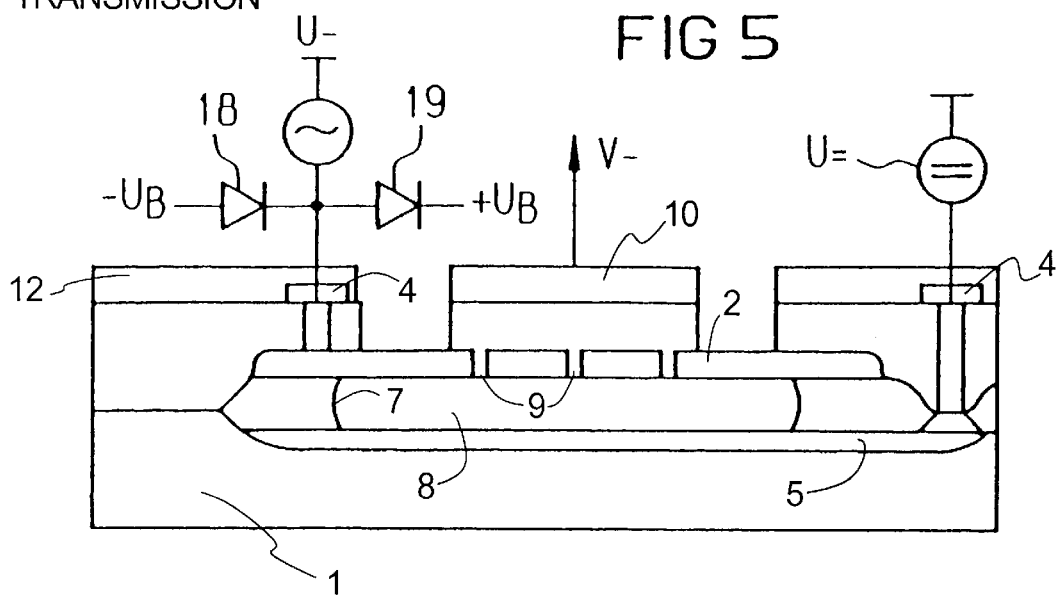
FIG. 5 shows the micromachined components in cross section together with the circuit diagram for transmission mode in accordance with the present invention.
Figure 6:
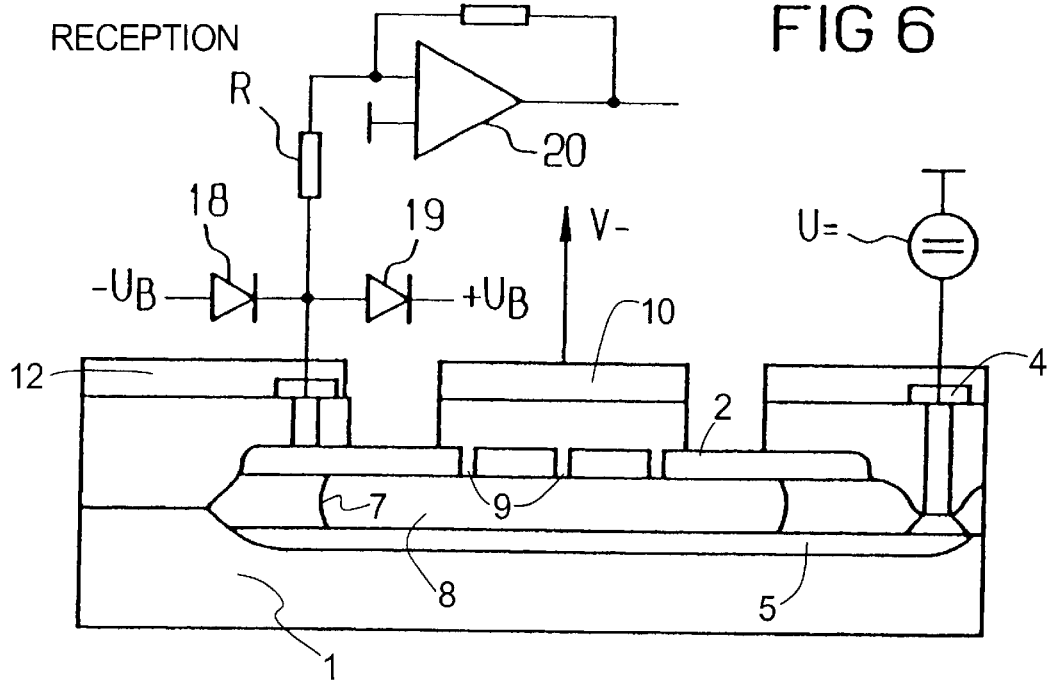
FIG. 6 shows the micromachined components in cross section together with the circuit diagram for reception mode in accordance with the present invention.

FIGS. 5 and 6 show such specific circuits for transmission mode and reception mode of the transducer. A dc voltage U=is applied as bias between the terminals 4 of the diaphragm 2 (or, the conductive cover layer) and the doped region 5. Both in transmission as well as in reception mode, the sensitivity of the transducer improves with elevation of the electrical field strength between the capacitor electrodes (between the diaphragm 2 and the doped region 5 in the described embodiment). The size of the maximally allowed field strength is limited by the physical properties of the materials employed or by the maximum excursion allowed. The purpose of the bias is to achieve an optimally great electromechanical coupling factor and, thus, an optimally high sensitivity of the transducer. The coupling factor reaches its highest value, one, when the diaphragm 2 is deflected by the bias toward the unstable point that is conditioned by the non-linear electrostatic effect. In the case of a coplanar deflection of the diaphragm 2 (plate capacitor with variable plate spacing), the maximum value of the deflection caused by a bias lies at 33% and lies correspondingly above this given diaphragms 2 of the inventive transducer that are arched upon deflection. Good efficiencies given stable working behavior in operation result given bias-conditioned static deflections of 1% through 20%.

The alternating voltage U=provided for the transmission mode is applied to one of the two terminals 4, the terminal 4 of the diaphragm 2 in the example of FIG. 5. Via diodes 18, 19, terminal 4 is connected to the operating potentials $-U_B$ and $+U_B$ of the electronic circuit. Potentials possibly adjacent thereat that are built up by charge carrier influence as a result of the buildup and dismantling of the high dc voltage U=are thus shorted to one of the operating potentials. The dc voltage U=is selected sufficiently high that a provided amplitude of the alternating voltage U at least effects a provided amplitude of the diaphragm 2 oscillation.

FIG. 6 shows a corresponding circuit for reception mode. The voltage U to be connected is replaced there by a suitable transistor pre-amplifier circuit that is symbolized in FIG. 6 by an operational amplifier circuit 20. In order to achieve an optimally high sensitivity and in order to eliminate the influence of circuit-conditioned or parasitic capacitances, the circuit has its input side designed for optimally low-impedance as a current amplifier. In order to increase the bandwidth, however, it can also be expedient to set the input resistance R of the circuit in combination with the value of the dc voltage U=such that the damping of the mechanical component optimally ensues. The dc voltage for reception mode also preferably lies between 10 Volts and 200 Volts. The dc voltage is selected sufficiently high that a predetermined, maximum excursion of the diaphragm at least effects a provided change of the value of this dc voltage and/or an induced electrical current with at least a provided intensity of current.

Although modifications and changes may be suggested by those of ordinary skill in the art, it is the intention of the inventors to embody within the patent warranted hereon all changes and modifications as reasonably and properly come within the scope of their contribution to the art.

What is claimed is:

1. A semiconductor device on a substrate comprising:
   doped region formed in said substrate,
   a micromachined diaphragm arranged on a spacer layer spaced from said doped region, said diaphragm being electrically conductive, a cavity that enables a maximum deflection of said diaphragm to said substrate between said doped region and said diaphragm, terminal contacts connected to said diaphragm and to said doped region, wherein said doped region, said diaphragm said spacer layer, said cavity said electrically conductive layer, and said terminal contacts comprise an ultrasonic transducer, and electronic components integrated on said substrate, said electronic components being connected to one another and to said terminal contacts, whereby an operating and drive circuit is formed and which can excite said diaphragm to ultrasonic oscillations.

2. A semiconductor device according to claim 1, wherein said diaphragm is silicon.

3. A semiconductor device according to claim 1, wherein said diaphragm has at least a surface provided with a cover layer of a material different from silicon.

4. A semiconductor device according to claim 1, further having a stamp-like shoulder in a middle portion of a surface of said diaphragm.

5. A semiconductor device according to claim 1, wherein said electronic components include complementary MOSFETs.

6. A semiconductor device according to claim 1, wherein said operating and drive circuit is designed for transmission mode and applies a dc voltage to said terminal contacts and applies an alternating voltage for excitation of an ultrasonic oscillation, said dc voltage is selected such that a provided amplitude of said alternating voltage at least effects a provided amplitude of said diaphragm oscillation.

7. A semiconductor device according to claim 1, wherein said operating and drive circuit is designed for reception mode and applies a dc voltage to said terminal contacts, said dc voltage is selected such that a maximum excursion of said diaphragm at least effects a change of the value of said dc voltage, and wherein a part of said drive circuit connected to one of said terminal contacts is an amplifier.

8. A semiconductor device according to claim 7, wherein said amplifier has an input resistance set such that a provided bandwidth of said receiver is effected.

9. A semiconductor device according to claim 1, further having two diodes connected to one of said terminal contacts, said two diodes being connected to operating potentials of a supply voltage such that a potential adjacent one of said terminal contacts that lies outside an interval limited by said operating potentials is shorted to one of said operating potentials.

10. A semiconductor device according to claim 1, wherein said operating and drive circuit is a multiplexer for alternate transmission and reception mode, and further having a switch as a component part of said operating and drive circuit, said switch enabling a switching between transmission and reception mode.

11. A semiconductor device according to claim 1, further having a number of ultrasonic transducers and further having operating and drive circuits for each of said number of ultrasonic transducers, wherein said operating and drive circuits are configured for switching said number of ultrasonic transducers to transmission and reception modes with coordination between said number of ultrasonic transducers.

12. A semiconductor device according to claim 11, wherein said operating and drive circuits are configured for switching said number of ultrasonic transducers to operation and off either individually or in groups in a predetermined time sequence.

13. A semiconductor device according to claim 11, wherein said number of ultrasonic transducers is permanently divided into a number of groups of ultrasonic transducers, and wherein said operating and drive circuits are configured for simultaneously switching said ultrasonic transducers of each group to operate or off.

14. A semiconductor device according to claim 11, wherein said operating and drive circuits are configured for switching a time-varying group from said number of ultrasonic transducers to operate, wherein said time-varying group is varied such that some of said number of ultrasonic transducers switched to operate are switched off and a number of other of said number of ultrasonic transducers are switched to operate at predetermined time intervals.

15. A semiconductor device according to claim 11, wherein said operating and drive circuits are configured for operating said number of ultrasonic transducers in transmission mode such that a directional effect of an emitted ultrasonic is effected by relative phases or time sequences of signals supplied to individual ultrasonic transducers of said number of ultrasonic transducers.

16. A semiconductor device according to claim 11, wherein said operating and drive circuits are configured for operating said number of ultrasonic transducers in reception mode such that a direction recognition of received ultrasonic is effected by a computational superimposition of relative phases or time sequences of signals received by individual ultrasonic transducers of said number of said ultrasonic transducers.

17. A semiconductor device according to claim 15, wherein said operating and drive circuits comprise at least one shift register.

18. A semiconductor device according to claim 11, wherein said number of ultrasonic transducers are arranged in a planar grid that is periodic at least in one direction, and wherein said number of ultrasonic transducers fill said grid.

19. A semiconductor device according to claim 13, wherein said number of ultrasonic transducers are arranged in a planar grid that is periodic at least in one direction, and wherein said number of groups of ultrasonic transducers that are respectively switched in common to operation fill a portion of said grid.

20. A semiconductor device according to claim 11, wherein said number of ultrasonic transducers are arranged in squares that form a gap-free parquetry of a plane, and wherein said surfaces of said diaphragms of said number of ultrasonic transducers are squares.

21. A semiconductor device according to claim 11, wherein said number of ultrasonic transducers are arranged such that a periodicity of arrangement of said number of ultrasonic transducers is avoided in every direction.

22. A semiconductor device according to claim 1, further comprising an electrically conductive layer arranged in a region of a surface of said diaphragm and mechanically connected to said diaphragm, and wherein said diaphragm is not electrically conductive.

23. A semiconductor device according to claim 1, wherein said operating and drive circuit can detect existing ultrasonic oscillations of said diaphragm.

* * * * *